United States Patent
Patil et al.

(10) Patent No.: US 12,366,186 B2
(45) Date of Patent: Jul. 22, 2025

(54) LUBRICANT MANIFOLD FOR INTERNAL COMBUSTION ENGINE

(71) Applicant: CUMMINS INC., Columbus, IN (US)

(72) Inventors: Shweta Nitin Patil, Columbus, IN (US); Chuan Wang, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/980,742

(22) Filed: Nov. 4, 2022

(65) Prior Publication Data

US 2023/0055229 A1 Feb. 23, 2023

Related U.S. Application Data

(63) Continuation of application No. PCT/US2021/030807, filed on May 5, 2021.
(Continued)

(51) Int. Cl.
*F01M 11/03* (2006.01)
*F01M 1/10* (2006.01)
(Continued)

(52) U.S. Cl.
CPC .............. *F01M 11/03* (2013.01); *F01M 1/10* (2013.01); *F01M 11/02* (2013.01); *B33Y 80/00* (2014.12);
(Continued)

(58) Field of Classification Search
CPC .......... F01M 11/03; F01M 1/10; F01M 11/02; F01M 2001/1007; F01M 2001/1092;
(Continued)

(56) References Cited

U.S. PATENT DOCUMENTS

| | | |
|---|---|---|
| 2,466,684 A | 4/1949 | Case |
| 3,223,197 A | 12/1965 | Conover et al. |
| | (Continued) | |

FOREIGN PATENT DOCUMENTS

| | | |
|---|---|---|
| CN | 105927411 A | 9/2016 |
| EP | 0 816 645 A1 | 1/1998 |
| | (Continued) | |

OTHER PUBLICATIONS

International Search Report and Written Opinion for PCT Application No. PCT/US2021/030807, dated Aug. 4, 2021.
(Continued)

*Primary Examiner* — Yi-Kai Wang
(74) *Attorney, Agent, or Firm* — Foley & Lardner LLP (57) ABSTRACT

A lubricant manifold includes a lubricant filter head, a pump inlet channel, an inlet transfer channel, and a lubricant cooler. The lubricant filter head is configured to be coupled to a lubricant filter. The pump inlet channel is fluidly coupled to the lubricant filter head and integrally formed with the lubricant filter head. The pump inlet channel is configured to receive a lubricant and provide the lubricant to the lubricant filter head. The inlet transfer channel is fluidly coupled to the lubricant filter head and integrally formed with the lubricant filter head and the pump inlet channel. The inlet transfer channel is configured to receive the lubricant from the pump inlet channel. The lubricant cooler is fluidly coupled to the inlet transfer channel and integrally formed with the lubricant filter head, the pump inlet channel, and the inlet transfer channel.

20 Claims, 6 Drawing Sheets

Related U.S. Application Data (60) Provisional application No. 63/021,926, filed on May 8, 2020.

(51) Int. Cl.
 *F01M 11/02* (2006.01)
 *B33Y 80/00* (2015.01)

(52) U.S. Cl.
 CPC ............... *F01M 2001/1007* (2013.01); *F01M 2001/1092* (2013.01); *F01M 2011/033* (2013.01); *F01M 2011/036* (2013.01)

(58) Field of Classification Search
 CPC ....... F01M 2011/033; F01M 2011/036; F01M 5/002; B33Y 80/00
 USPC ...................................................... 123/196 A
 See application file for complete search history.

(56) References Cited

U.S. PATENT DOCUMENTS

| | | | |
|---|---|---|---|
| 3,644,915 A | | 2/1972 | McBurnett |
| 4,967,835 A | | 11/1990 | Lefeber |
| 5,199,395 A | | 4/1993 | Mizumura et al. |
| 5,351,664 A | * | 10/1994 | Rotter ................. F16H 57/0415 |
| | | | 123/196 AB |
| 5,558,154 A | | 9/1996 | Lefeber |
| 5,647,306 A | * | 7/1997 | Pateman ................. F01M 5/002 |
| | | | 123/196 AB |
| 6,263,962 B1 | | 7/2001 | Komoda et al. |
| 7,810,552 B2 | | 10/2010 | Slaughter |
| 7,866,372 B2 | | 1/2011 | Slaughter |
| 8,375,917 B1 | | 2/2013 | Neal et al. |
| 9,200,855 B2 | | 12/2015 | Kington et al. |
| 9,467,023 B2 | | 10/2016 | Pal |
| 9,746,257 B2 | | 8/2017 | Fennessy |
| 2004/0055740 A1 | | 3/2004 | Meshenky et al. |
| 2004/0182566 A1 | | 9/2004 | Jainek |
| 2007/0175434 A1 | | 8/2007 | Gruner et al. |
| 2010/0116465 A1 | * | 5/2010 | Jainek ..................... F28F 27/02 |
| | | | 29/726 |
| 2013/0097832 A1 | * | 4/2013 | Ostein ..................... F01M 1/16 |
| | | | 29/225 |
| 2013/0153475 A1 | | 6/2013 | Jainek |
| 2013/0277011 A1 | | 10/2013 | Jainek |
| 2015/0114611 A1 | | 4/2015 | Morris et al. |
| 2017/0354933 A1 | * | 12/2017 | Rupp ..................... B01D 69/06 |
| 2019/0162087 A1 | * | 5/2019 | Rosenberger ............ F01M 1/10 |
| 2021/0355832 A1 | * | 11/2021 | Rathay ................... F01D 5/181 |

FOREIGN PATENT DOCUMENTS

| | | |
|---|---|---|
| WO | WO-2013/163398 A1 | 10/2013 |
| WO | WO-2018/073358 A1 | 4/2018 |

OTHER PUBLICATIONS

Search Report for EP Application No. 21800129.5, dated Mar. 22, 2024, pp. 1-10.
Office Action for CN Application No. CN 202180032382.4, dated Jan. 24, 2025.

* cited by examiner

LUBRICANT MANIFOLD FOR INTERNAL COMBUSTION ENGINE

CROSS-REFERENCE TO RELATED PATENT APPLICATION

The present application is a continuation of PCT Application No. PCT/US2021/030807, filed May 5, 2021, which claims priority to and the benefit of U.S. Provisional Patent Application No. 63/021,926, filed May 8, 2020, the contents of which are incorporated herein by reference.

TECHNICAL FIELD

The present application relates generally to lubricant manifolds for internal combustion engines.

BACKGROUND

For internal combustion engines, such as diesel engines, a lubricant is utilized to reduce friction between moving components, such as between pistons and cylinders. Particulates, such as soot, become mixed with the lubricant over time. It therefore may be desired to remove the particulates from the lubricant without removing the lubricant. Many systems remove the particulates by passing the lubricant through a filter. Additionally, it is often desired to cool the lubricant. For example, cooling the lubricant can ensure that properties of the lubricant remain desirable in applications, such as in high performance or high horse power engines, where the lubricant is subjected to relatively high temperatures.

SUMMARY

In one set of embodiments, a lubricant manifold includes a lubricant filter head, a pump inlet channel, an inlet transfer channel, and a lubricant cooler. The lubricant filter head is configured to be coupled to a lubricant filter. The pump inlet channel is fluidly coupled to the lubricant filter head and integrally formed with the lubricant filter head. The pump inlet channel is configured to receive a lubricant and provide the lubricant to the lubricant filter head. The inlet transfer channel is fluidly coupled to the lubricant filter head and integrally formed with the lubricant filter head and the pump inlet channel. The inlet transfer channel is configured to receive the lubricant from the pump inlet channel. The lubricant cooler is fluidly coupled to the inlet transfer channel and integrally formed with the lubricant filter head, the pump inlet channel, and the inlet transfer channel. The lubricant cooler is configured to receive the lubricant from the inlet transfer channel.

In another set of embodiments, an internal combustion engine system includes an engine head-block assembly and a lubricant manifold. The engine head-block assembly includes a lubricant manifold recess and a mounting face. The mounting face extends around the lubricant manifold recess. The lubricant manifold includes a body. The body is at least partially received within the lubricant manifold recess. The body includes a lubricant filter head, a lubricant cooler, and a flange. The lubricant filter head is configured to be coupled to a lubricant filter. The lubricant cooler is fluidly coupled to the lubricant filter head and integrally formed with the lubricant filter head. The lubricant cooler provides a lubricant to the lubricant filter head. The flange is integrally formed with the lubricant filter head and the lubricant cooler. The flange is coupled to the mounting face such that the lubricant cooler is at least partially received within the lubricant manifold recess.

In yet another set of embodiments, a lubricant manifold includes a lubricant cooler, an outlet transfer channel, and a lubricant filter head. The lubricant cooler is configured to receive a lubricant. The outlet transfer channel is fluidly coupled to the lubricant cooler and integrally formed with the lubricant cooler. The outlet transfer channel is configured to receive the lubricant from the lubricant cooler. The lubricant filter head is configured to be coupled to a lubricant filter. The lubricant filter head fluidly is coupled to the outlet transfer channel and integrally formed with the lubricant cooler and the outlet transfer channel. The lubricant filter head is configured to receive the lubricant from the lubricant cooler.

BRIEF DESCRIPTION OF THE DRAWING

The details of one or more implementations are set forth in the accompanying drawing and the description below. Other features, aspects, and advantages of the disclosure will become apparent from the description, the drawing, and the claims, in which:

It will be recognized that the Figures are schematic representations for purposes of illustration. The Figure are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a lubricant manifold for an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Many oil systems utilize oil coolers that are manufactured using multiple components. These components are brazed together using materials such copper and nickel. In addition to oil coolers being constructed from multiple components, oil filter housings are also often assembled from multiple components. In addition to being constructed from multiple components, these components are often attached together through the use of fasteners. These fasteners increase the complexity of assembly of the oil filter housings and oil coolers. These fasteners may also create leak paths through the oil filter housings and oil coolers. While gaskets may be included to mitigate these leak paths, gaskets may deteriorate over time, resulting in potential leaks.

In addition to leaks being undesirable from a performance and engine reliability standpoint, leaks can also cause aesthetic and cleanliness issues. For example, where copper from components that were brazed together using copper leaches into oil that is consumed by an engine, the copper can deposit on surfaces within the engine. These deposits can mitigate heat transfer between a piston of the engine and oil. Additionally, the copper can increase temperatures of pistons within the engine, and therefore oil temperature within the engine, because the copper reduces transfer of heat from the piston. Higher oil temperatures increase a rate of oil oxidation and therefore cause increased degradation of the oil, which requires increasingly frequent oil changes, which are undesirable.

Implementations described herein are related to an internal combustion engine system that includes a lubricant manifold with a body that is formed via additive manufacturing. The body includes a lubricant filter head that is configured to be coupled to a lubricant filter. The body also includes a lubricant cooler that is configured to cool the lubricant. The lubricant filter head and the lubricant cooler are integrally formed via additive manufacturing. As a result, there are no leakage paths between the lubricant filter head and the lubricant cooler. By eliminating the leakage paths present in other systems that are formed by assembly of multiple separate components (e.g., a filter head that is bolted to a cooler), the lubricant manifold described herein is capable of protecting lubricant from leaking out on other components of the engine. Furthermore, the lubricant manifold described herein does not use external brazing materials. In this way, the lubricant manifold described herein does not include copper which can leach out into the lubricant, thereby maintaining desirable heat transfer between the piston and the lubricant.

II. Example Lubricant Manifold

Figure 1:
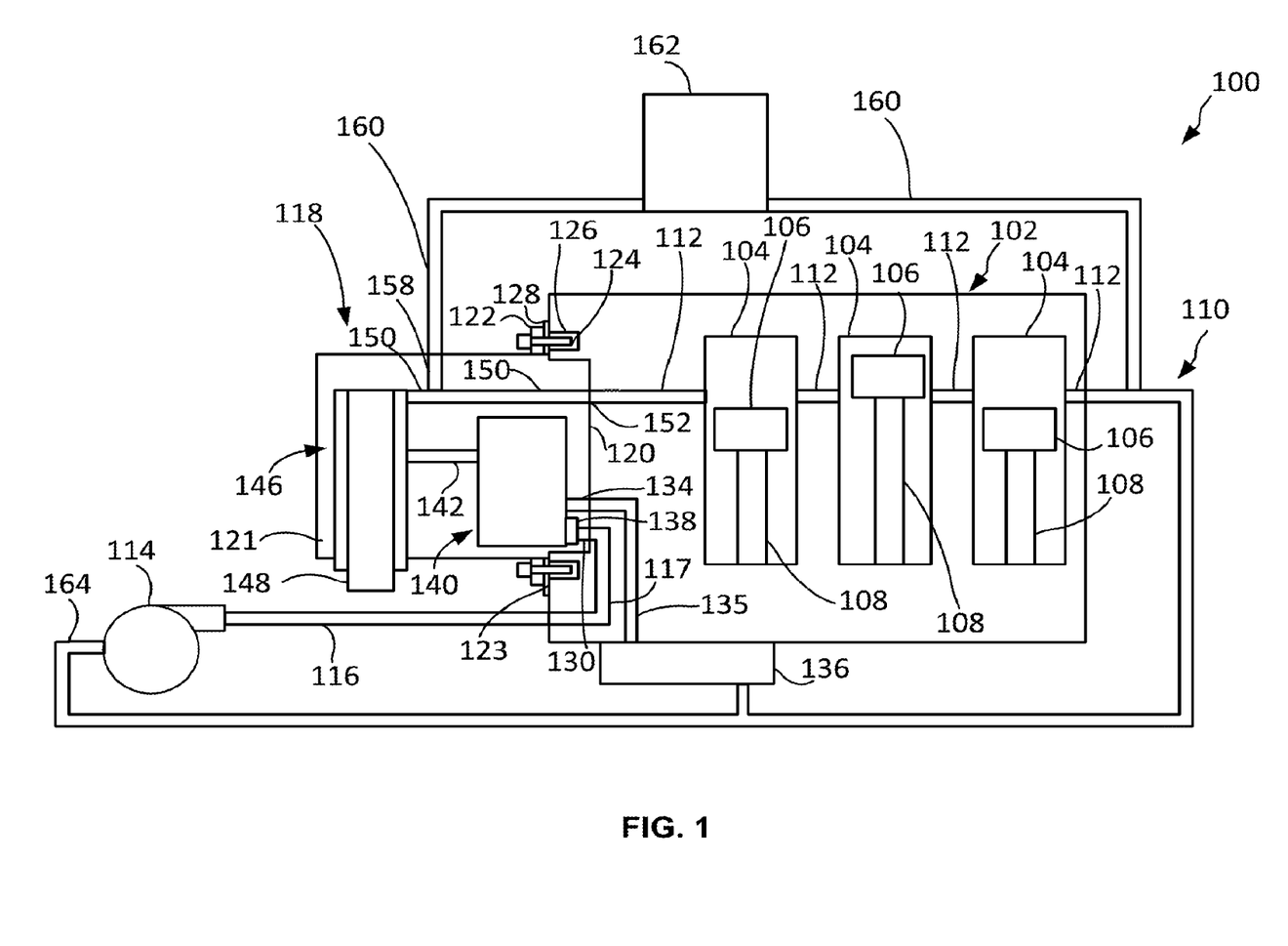
FIG. 1 is a block schematic diagram of an example internal combustion engine system with a lubricant manifold and an engine head-block assembly.

FIG. 1 depicts an internal combustion engine system 100 (e.g., diesel internal combustion engine system, gasoline internal combustion engine system, bi-fuel internal combustion engine system, hybrid internal combustion engine system, etc.). The internal combustion engine system 100 includes an engine head-block assembly 102 (e.g., cylinder block and cylinder head, etc.).

The engine head-block assembly 102 defines at least one cylinder 104 (e.g., combustion chamber, etc.). Each cylinder 104 receives air and fuel and provides exhaust after a combustion of the air and the fuel occurs within the cylinder 104. The internal combustion engine system 100 also includes a piston 106 for each cylinder 104 and a connecting rod 108 for each cylinder 104. For example, if the engine head-block assembly 102 defines four cylinders 104, the internal combustion engine system 100 includes four pistons 106 and four connecting rods 108.

Each piston 106 is received within one of the cylinders 104 and is selectively repositioned (e.g., translated, slid, etc.) within the cylinder 104 during a combustion cycle occurring within the cylinder 104. The connecting rod 108 is coupled to the piston 106 and receives energy from movement of the piston 106 by combustion within the cylinder 104. The energy received from each of the connecting rods 108 is harnessed by the internal combustion engine system 100 (e.g., using a crankshaft, etc.) and provided to an output (e.g., driveshaft, etc.).

The cylinder 104 and the piston 106 are sized to have diameters that are within a relatively small percentage (e.g., less than 1%, less than 0.5%, etc.) of one another. Movement of the piston 106 within the cylinder 104 is facilitated by this difference. Additionally, it is desirable for this difference to be as small as possible in order to increase energy provided to the connecting rod 108.

In order to enable the difference between the diameter of the cylinder 104 and the diameter of the piston 106 to be as small as possible, the internal combustion engine system 100 circulates a lubricant (e.g., oil, etc.) between the cylinder 104 and the piston 106. The lubricant may provide both a fluid seal between the cylinder 104 and the piston 106 as well as a mechanism for minimizing friction between the cylinder 104 and the piston 106.

The internal combustion engine system 100 includes a lubricant system 110 (e.g., oil system, etc.) that circulates the lubricant. The engine head-block assembly 102 includes lubricant passages 112 (e.g., galleries, runners, etc.) through which the lubricant is routed. The lubricant passages 112 deliver the lubricant between the piston 106 and the cylinder 104. Additionally, the lubricant passages 112 may deliver the lubricant to other components of the engine head-block assembly 102 (e.g., valves, lifters, etc.).

The lubricant system 110 includes a lubricant pump 114 (e.g., oil pump, etc.). The lubricant pump 114 is configured to be (e.g., structured to be, capable of being, etc.) controlled (e.g., by an engine control unit (ECU), crank gear driven, etc.) to cause circulation of the lubricant within the lubricant system 110. The lubricant pump 114 is fluidly coupled to (e.g., in fluid communication with, connected to, etc.) an inlet conduit 116 (e.g., oil line, etc.) of the lubricant system 110. The inlet conduit 116 is configured to receive the lubricant from the lubricant pump 114.

The inlet conduit 116 is fluidly coupled to a lubricant inlet channel 117 (e.g., inlet passage, etc.) in the engine head-block assembly 102. For example, the inlet conduit 116 may be coupled to the lubricant inlet channel 117 via a hose clamp (e.g., Marmon clamp, etc.) such that the inlet conduit 116 is fluidly coupled to the lubricant inlet channel 117. The lubricant inlet channel 117 is configured to receive the lubricant from the inlet conduit 116. The lubricant inlet channel 117 is fluidly coupled to a lubricant manifold 118 (e.g., integrated cooler, etc.). The lubricant manifold 118 is configured to receive the lubricant from the lubricant inlet channel 117. As is explained in more detail herein, the lubricant manifold 118 is received within a lubricant manifold recess 120 (e.g., hole, etc.) that is formed within the engine head-block assembly 102. The lubricant manifold recess 120 is in communication with the lubricant passages 112 such that the lubricant passages 112 are configured to receive the lubricant from the lubricant manifold 118 when the lubricant manifold 118 is received within the lubricant manifold recess 120.

The lubricant manifold 118 includes a body 121 (e.g., frame, shell, etc.). As is explained in more detail herein, the body 121 is of a one-piece construction. As a result, there are no gaps between components of the body 121. By eliminating gaps between components of the body 121, the lubricant manifold 118 is not prone to leakage of the lubricant between components of the body 121. In this way, the lubricant manifold 118 presents an improvement over other conventional systems which include multiple components that are attached together (e.g., using fasteners, using brazed joints, etc.) because joints between those components facilitate leakage.

Additionally, the elimination of joints between multiple components also eliminates use of joining materials (e.g., brazing materials, copper brazing, etc.). By avoiding use of joining materials between components of the body 121, the lubricant manifold 118 may eliminate or significantly decrease leaching of contaminants into the lubricant compared to other systems which may leach contaminants, such as copper, into oil. This may also result in the lubricant circulated within the lubricant manifold 118 being oxidized less, and therefore having higher quality, than other conventional systems which include multiple components that are attached together using joining materials. As a result, the lubricant manifold 118 may ensure desirable operation of the internal combustion engine system 100, thereby increasing intervals between lubricant replenishment events (e.g., oil changes, etc.) compared to other systems which include multiple components that are attached together.

Figure 2:
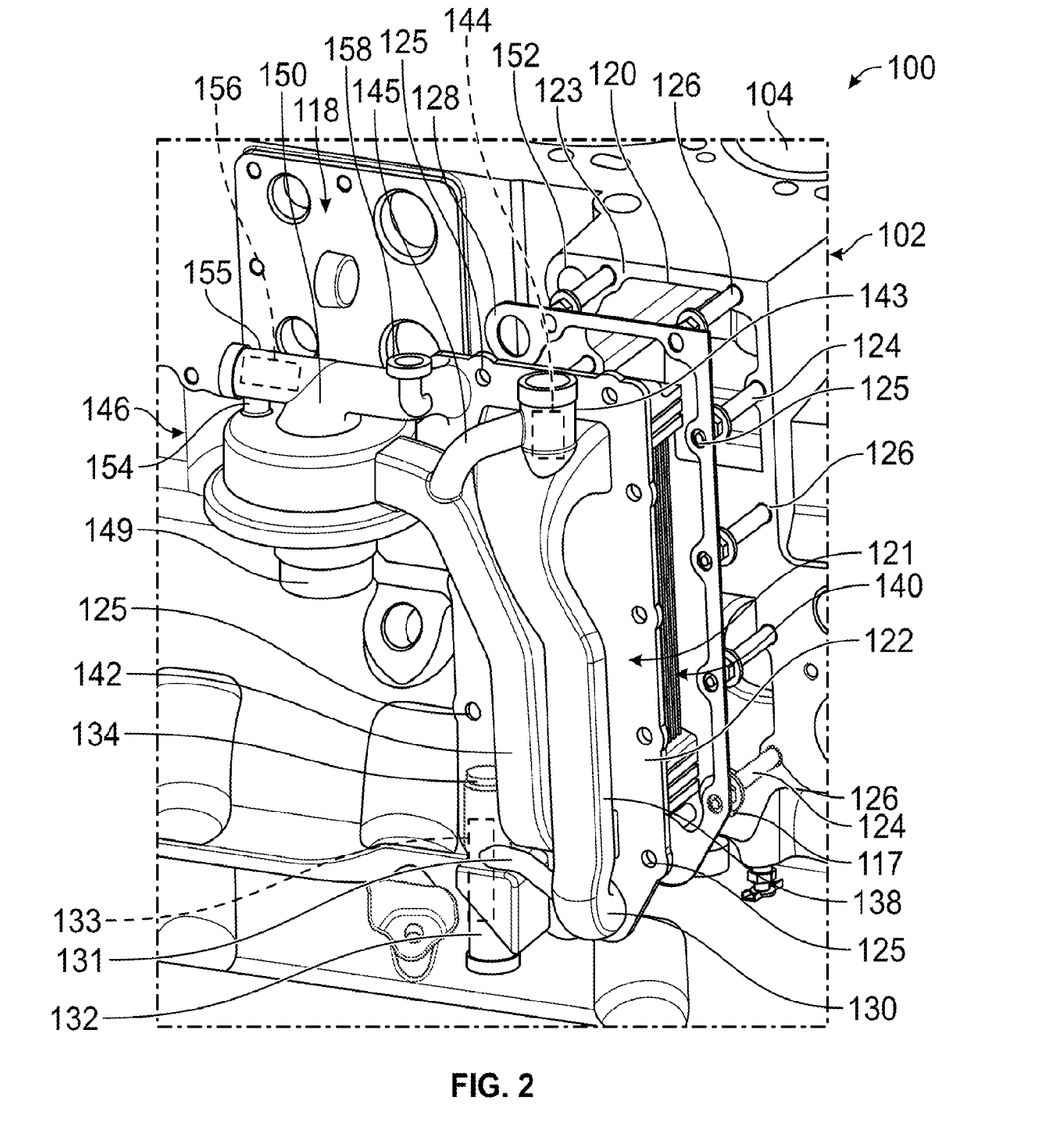
FIG. 2 is a perspective exploded view of the lubricant manifold and the engine head-block assembly of FIG. 1.

The body 121 includes a flange 122 (e.g., rim, ledge, etc.). The flange 122 is integrally formed with the body 121 (e.g., the flange 122 and the body 121 are of a one-piece construction, etc.). As utilized herein, two or more elements are "integrally formed" with each when the two or more elements are formed and joined together as part of a single manufacturing step to a create a single-piece or unitary construction that cannot be disassembled without an at least partial destruction of the overall component. The flange 122 is coupled to a mounting face 123 (e.g., surface, etc.) of the engine head-block assembly 102. The mounting face 123 extends around the lubricant manifold recess 120. In some embodiments, the mounting face 123 is disposed along a first plane and the flange 122 is disposed along a second plane that is configured to be (e.g., upon rotation of the flange 122 relative to the mounting face 123, etc.) parallel to the first plane along which the mounting face 123 is disposed.

The flange 122 is coupled to the mounting face 123 using at least one fastener 124 (e.g., bolt, etc.). The fasteners 124 extend through apertures 125 (e.g., holes, slots, openings, etc.) in the flange 122. After being inserted through one of the apertures 125, the fastener 124 is coupled to a receiver 126 (e.g., threaded receiver, threaded hole, etc.) in the engine head-block assembly 102. For example, the fastener 124 may be inserted through one of the apertures 125 and threaded into one of the receivers 126.

The lubricant manifold 118 includes a gasket 128 (e.g., o-ring, seal, etc.). The gasket 128 is positioned between the mounting face 123 and the flange 122 when the flange 122 is coupled to the engine head-block assembly 102. The gasket 128 is not integrally formed with the body 121. Additionally, the gasket 128 is formed from a first material (e.g., polytetrafluoroethylene, compressible material, etc.) and the body 121 is formed from a second material (e.g., metal, incompressible material, etc.) that is different from the first material. The gasket 128 is configured to extend around the lubricant manifold recess 120. In some embodiments, the gasket 128 includes apertures through which the fasteners 124 extend between the flange 122 and the receivers 126.

As shown in FIG. 2, the body 121 includes a pump inlet channel 130 (e.g., passage, passageway, runner, etc.). The pump inlet channel 130 is integrally formed with the body 121 (e.g., the body 121 and the pump inlet channel 130 are of a one-piece construction, etc.). The pump inlet channel 130 is configured to be fluidly coupled to the lubricant inlet channel 117 when the flange 122 is coupled to the engine head-block assembly 102. The pump inlet channel 130 is configured to receive the lubricant from the lubricant inlet channel 117 when the flange 122 is coupled to the engine head-block assembly 102.

The body 121 also includes an inlet bypass channel 131 (e.g., passage, passageway, runner, etc.). The inlet bypass channel 131 is integrally formed with the body 121 (e.g., the body 121 and the inlet bypass channel 131 are of a one-piece construction, etc.). The inlet bypass channel 131 is fluidly coupled to the pump inlet channel 130 and is configured to receive the lubricant from the pump inlet channel 130 when the pump inlet channel 130 is fluidly coupled to the lubricant inlet channel 117.

The body 121 also includes a high pressure release valve port 132 (e.g., aperture, opening, etc.). The high pressure release valve port 132 is integrally formed with the body 121 (e.g., the body 121 and the high pressure release valve port 132 are of a one-piece construction, etc.). The high pressure release valve port 132 is fluidly coupled to the inlet bypass channel 131 and is configured to receive the lubricant from the inlet bypass channel 131 when the pump inlet channel 130 is fluidly coupled to the lubricant inlet channel 117.

The lubricant manifold 118 also includes a high pressure release valve 133 (e.g., blow-off valve, pressure regulator, etc.). The high pressure release valve 133 is disposed within the high pressure release valve port 132 and the high pressure release valve port 132 is sealed (e.g., using a plug, etc.) such that the lubricant can flow into the high pressure release valve 133 but not out of the high pressure release valve port 132. For example, the high pressure release valve 133 may be inserted into the high pressure release valve port 132 after manufacturing of the body 121, and then the high pressure release valve port 132 may be plugged prior to use of the lubricant manifold 118 (e.g., during a subsequent manufacturing step, etc.).

The body 121 also includes a high pressure release valve channel 134 (e.g., passage, passageway, runner, etc.). The high pressure release valve channel 134 is integrally formed with the body 121 (e.g., the body 121 and the high pressure release valve channel 134 are of a one-piece construction, etc.). The high pressure release valve channel 134 is fluidly coupled to the high pressure release valve 133 and is configured to selectively receive the lubricant from the high pressure release valve 133. Specifically, the high pressure release valve 133 is configured to open and provide the lubricant from the inlet bypass channel 131 to the high pressure release valve channel 134 when a pressure of the lubricant within the inlet bypass channel 131 exceeds a threshold pressure. The high pressure release valve 133 is also configured such that the lubricant is not provided from the inlet bypass channel 131 to the high pressure release valve channel 134 unless the pressure of the lubricant within the inlet bypass channel 131 exceeds the threshold pressure.

The engine head-block assembly 102 also includes a lubricant bypass channel 135 (e.g., bypass passage, etc.). The lubricant bypass channel 135 is fluidly coupled to the high pressure release valve channel 134 when the flange 122 is coupled to the engine head-block assembly 102. The lubricant bypass channel 135 is configured to receive the lubricant from the high pressure release valve channel 134 (e.g., when the pressure of the lubricant within the inlet bypass channel 131 exceeds the threshold pressure).

The engine head-block assembly 102 also includes a lubricant pan 136 (e.g., oil pan, tray, etc.). The lubricant pan 136 is fluidly coupled to the lubricant bypass channel 135. The lubricant pan 136 is configured to receive the lubricant from the lubricant bypass channel 135 when the flange 122 is coupled to the engine head-block assembly 102. In some embodiments, the lubricant pan 136 may also be fluidly coupled to the lubricant passages 112 and configured to receive the lubricant from the lubricant passages 112. Thus, when the pressure of the lubricant within the inlet bypass channel 131 exceeds the threshold pressure, the lubricant may be provided into the high pressure release valve channel 134, from the high pressure release valve channel 134 into the lubricant bypass channel 135, and from the lubricant bypass channel 135 to the lubricant pan 136. As is explained in more detail herein, the lubricant within the lubricant pan 136 may be later recirculated within the lubricant system 110, The body 121 also includes an inlet transfer channel 138 (e.g., passage, passageway, runner, etc.). The inlet transfer channel 138 is integrally formed with the body 121 (e.g., the body 121 and the inlet transfer channel 138 are of a one-piece construction, etc.). The inlet transfer channel 138 is fluidly coupled to the pump inlet channel 130. The inlet transfer channel 138 is configured to receive the lubricant from the pump inlet channel 130 when the flange 122 is coupled to the engine head-block assembly 102.

The body 121 also includes a lubricant cooler 140 (e.g., oil cooler, heat exchanger, etc.). The lubricant cooler 140 is integrally formed with the body 121 (e.g., the body 121 and the lubricant cooler 140 are of a one-piece construction, etc.). The lubricant cooler 140 is fluidly coupled to the inlet transfer channel 138 and is configured to receive the lubricant from the inlet transfer channel 138. As is explained in more detail herein, the lubricant cooler 140 is configured to provide cooling to the lubricant within the lubricant cooler 140.

Figure 3:
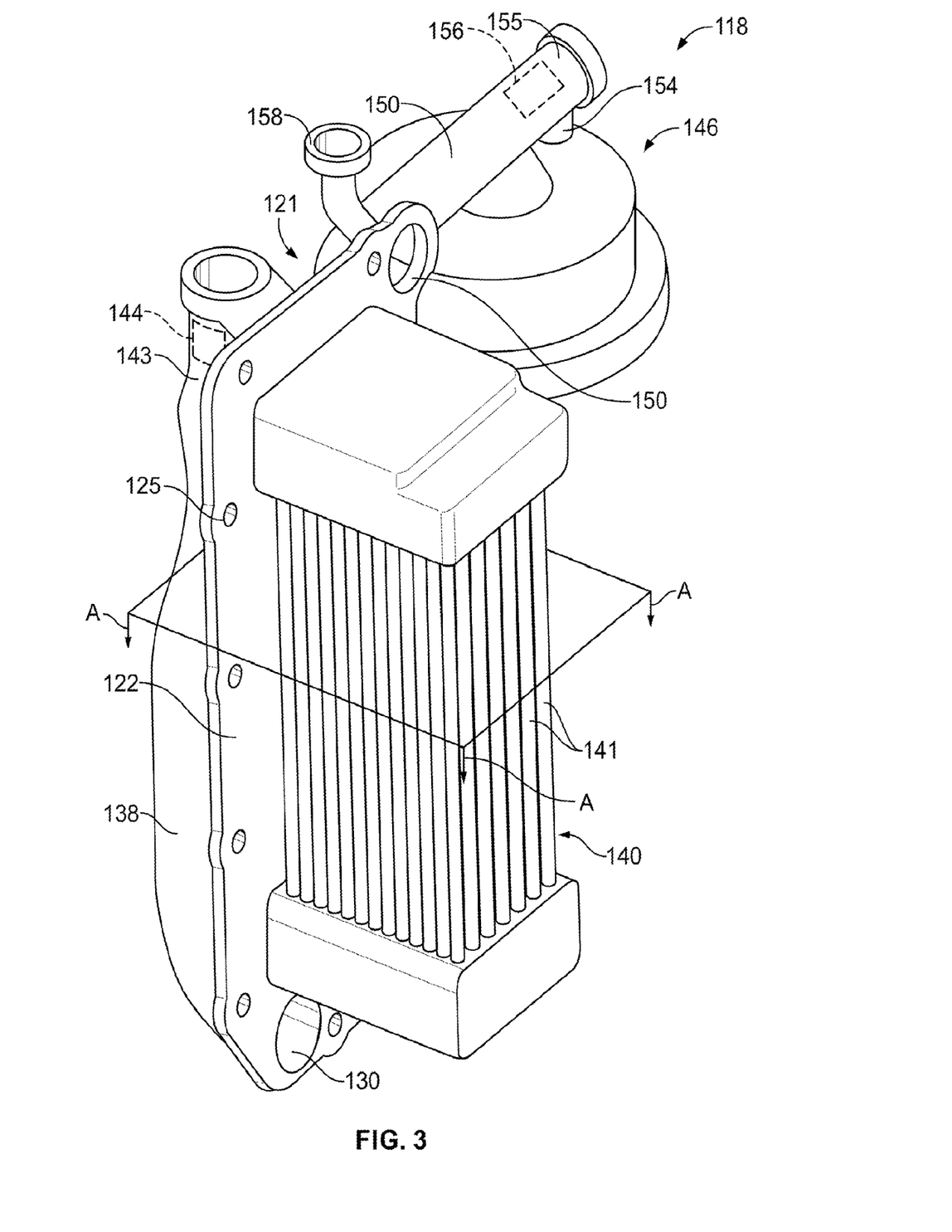
FIG. 3 is a perspective view of the lubricant manifold of FIG. 1.
Figure 4:
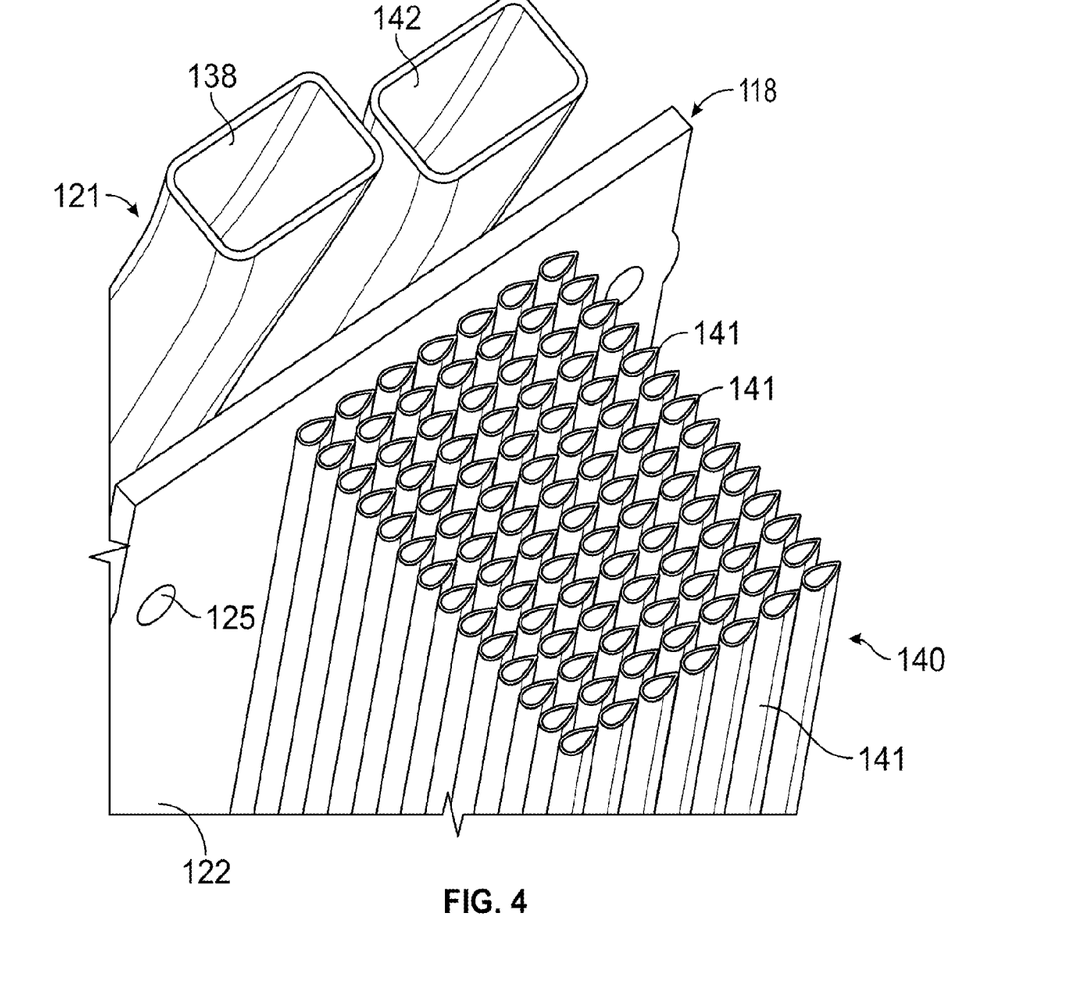
FIG. 4 is a cross-sectional view of the lubricant manifold taken along plane A-A of FIG. 3.

As shown in FIGS. 3 and 4, the lubricant cooler 140 includes a plurality of lubricant passages 141 (e.g., channels, tubes, etc.). The lubricant cooler 140 circulates the lubricant through the lubricant passages 141 to cool the lubricant. A liquid coolant flow may be created through the lubricant passages 141, thereby providing cooling to the lubricant passages 141 which the lubricant passages 141 provide to the lubricant.

The body 121 also includes an outlet transfer channel 142 (e.g., passage, passageway, runner, etc.). The outlet transfer channel 142 is integrally formed with the body 121 (e.g., the body 121 and the outlet transfer channel 142 are of a one-piece construction, etc.). The outlet transfer channel 142 is fluidly coupled to the lubricant cooler 140 and is configured to receive the lubricant from the lubricant cooler 140.

The body 121 also includes a thermostat port 143 (e.g., aperture, opening, etc.). The thermostat port 143 is integrally formed with the body 121 (e.g., the body 121 and the thermostat port 143 are of a one-piece construction, etc.). The thermostat port 143 is fluidly coupled to the inlet transfer channel 138 and is configured to receive the lubricant from the inlet transfer channel 138.

The lubricant manifold 118 also includes a thermostat 144 (e.g., temperature regulator, etc.). The thermostat 144 is disposed within the thermostat port 143 and the thermostat port 143 is sealed (e.g., using a plug, etc.) such that the lubricant can flow into the thermostat 144 but not out of the thermostat port 143. For example, the thermostat 144 may be inserted into the thermostat port 143 after manufacturing of the body 121, and then the thermostat port 143 may be plugged prior to use of the lubricant manifold 118 (e.g., during a subsequent manufacturing step, etc.).

The body 121 also includes a thermostat channel 145 (e.g., passage, passageway, runner, etc.). The thermostat channel 145 is integrally formed with the body 121 (e.g., the body 121 and the thermostat channel 145 are of a one-piece construction, etc.). The thermostat channel 145 is fluidly coupled to the thermostat 144 and is configured to selectively receive the lubricant from the thermostat 144. Additionally, the thermostat channel 145 is fluidly coupled to the outlet transfer channel 142 and configured to selectively provide the lubricant to the outlet transfer channel 142. Specifically, the thermostat 144 is configured to open and provide the lubricant from the inlet transfer channel 138 to the thermostat channel 145 when a temperature of the lubricant within the inlet transfer channel 138 is below a threshold temperature. The thermostat 144 is also configured such that the lubricant is not provided from the inlet transfer channel 138 to the thermostat channel 145 unless the temperature of the lubricant within the inlet transfer channel 138 is below the threshold temperature. As a result, the lubricant within the inlet transfer channel 138 may bypass the lubricant cooler 140 when cooling provided by the lubricant cooler 140 is not needed (e.g., when the temperature of the lubricant within the inlet transfer channel 138 is below the temperature threshold). In this way, a backpressure of the lubricant may be decreased.

The body 121 also includes a lubricant filter head 146 (e.g., receiver, etc.). The lubricant filter head 146 is integrally formed with the body 121 (e.g., the body 121 and the lubricant filter head 146 are of a one-piece construction, etc.). The lubricant filter head 146 is fluidly coupled to the outlet transfer channel 142 and configured to receive the lubricant from the outlet transfer channel 142.

The lubricant filter head 146 is configured to be coupled to a lubricant filter 148 (e.g., oil filter, etc.) such that the lubricant filter 148 is fluidly coupled to the lubricant filter head 146. In various embodiments, the lubricant filter head 146 includes a threaded post 149 that is configured to be threadedly coupled to the lubricant filter 148. In other embodiments, the lubricant filter head 146 may include a threaded aperture into which the lubricant filter 148 is configured to be threaded.

The lubricant filter head 146 is configured to provide the lubricant from the outlet transfer channel 142 to the lubricant filter 148 when the lubricant filter 148 is fluidly coupled to the lubricant filter head 146. Additionally, the lubricant filter head 146 is configured such that the lubricant filter 148 can be fluidly coupled to, and fluidly decoupled from, the lubricant filter head 146 without decoupling of the lubricant manifold 118 from the engine head-block assembly 102.

The lubricant filter 148 is configured to filter particulates (e.g., soot, metallic particles, etc.) from the lubricant such that the lubricant exiting the lubricant filter 148 contains less particulates than the lubricant entering the lubricant filter 148 (e.g., flowing from the outlet transfer channel 142).

The lubricant filter head 146 is also configured to receive the lubricant from the lubricant filter 148 when the lubricant filter 148 is fluidly coupled to the lubricant filter head 146. The lubricant received by the lubricant filter head 146 from the lubricant filter 148 has been filtered by the lubricant filter 148. In this way, the lubricant filter head 146 is configured to separately provide lubricant to, and receive lubricant from, the lubricant filter 148.

The body 121 also includes a main outlet channel 150 (e.g., passage, passageway, runner, etc.). The main outlet channel 150 is integrally formed with the body 121 (e.g., the body 121 and the main outlet channel 150 are of a one-piece construction, etc.). The main outlet channel 150 is fluidly coupled to the lubricant filter head 146 and is configured to receive the lubricant from the lubricant filter head 146 (e.g., after passing through the lubricant filter 148).

Figure 5:
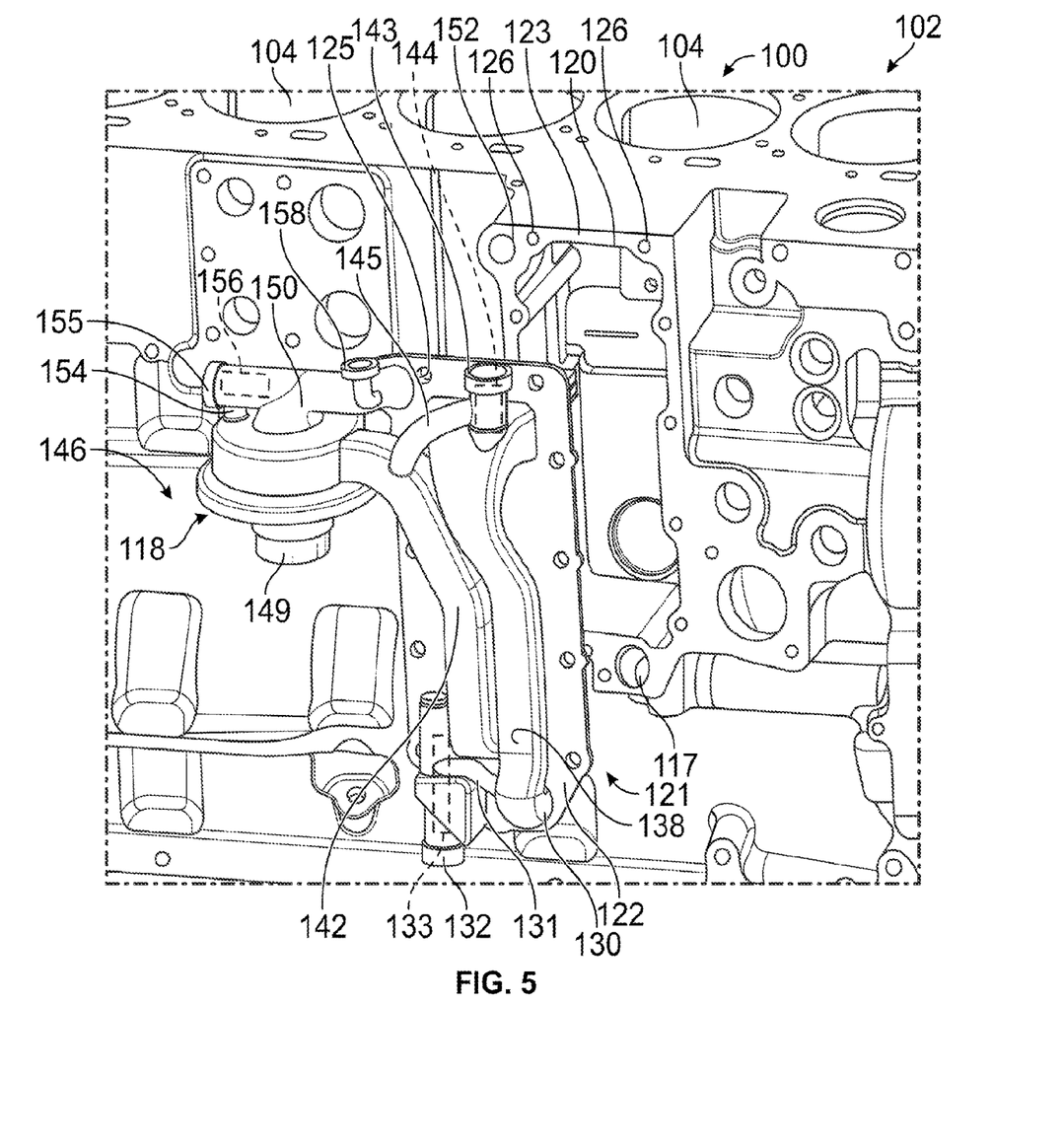
FIG. 5 is another perspective exploded view of the lubricant manifold and the engine head-block assembly of FIG. 1.

The engine head-block assembly 102 also includes an engine inlet aperture 152 (e.g., opening, hole, etc.) formed in the mounting face 123 and/or the lubricant manifold recess 120. The engine inlet aperture 152 is configured to receive the lubricant from the main outlet channel 150 when the flange 122 is coupled to the engine head-block assembly 102. The engine inlet aperture 152 is fluidly coupled to the lubricant passages 112 and configured to receive the lubricant from the main outlet channel 150 when the flange 122 is coupled to the engine head-block assembly 102 and to provide the lubricant to the lubricant passages 112.

The body 121 also includes a filter bypass channel 154 (e.g., passage, passageway, runner, etc.). The filter bypass channel 154 is integrally formed with the body 121 (e.g., the body 121 and the filter bypass channel 154 are of a one-piece construction, etc.). The filter bypass channel 154 is fluidly coupled to the lubricant filter head 146 and is configured to receive lubricant from the lubricant filter 148 and/or the outlet transfer channel 142. Specifically, the filter bypass channel 154 is configured to receive the lubricant from the outlet transfer channel 142 without the lubricant having to flow through the entirety of the lubricant filter 148. Instead, the filter bypass channel 154 may receive the lubricant from the outlet transfer channel 142 without the lubricant ever flowing through the lubricant filter 148, or with the lubricant only flowing through a portion (e.g., edge, endcap, etc.) of the lubricant filter 148

The body 121 also includes a bypass valve port 155 (e.g., aperture, opening, etc.). The bypass valve port 155 is integrally formed with the body 121 (e.g., the body 121 and the bypass valve port 155 are of a one-piece construction, etc.). The bypass valve port 155 is fluidly coupled to the filter bypass channel 154 and the main outlet channel 150. As is explained in more detail herein, the bypass valve port 155 is configured to receive the lubricant from the filter bypass channel 154 and to selectively provide the lubricant to the main outlet channel 150.

The lubricant manifold 118 also includes a bypass valve 156 (e.g., pressure regulator, pressure relief valve, etc.). The bypass valve 156 is disposed within the bypass valve port 155 and the bypass valve port 155 is sealed (e.g., using a plug, etc.) such that the lubricant can flow into the bypass valve 156 but not out of the bypass valve port 155. For example, the bypass valve 156 may be inserted into the bypass valve port 155 after manufacturing of the body 121 and then the bypass valve port 155 may be plugged prior to use of the lubricant manifold 118 (e.g., during a subsequent manufacturing step, etc.).

The bypass valve 156 is configured to open and provide the lubricant from the filter bypass channel 154 to the main outlet channel 150 (e.g., via the bypass valve port 155) when a pressure of the lubricant within the filter bypass channel 154 exceeds a threshold pressure. The bypass valve 156 is also configured such that the lubricant is not provided from the filter bypass channel 154 to the main outlet channel 150 unless the pressure of the lubricant within the bypass valve 156 exceeds the threshold pressure. As a result, the lubricant within the filter bypass channel 154 may bypass the lubricant filter 148. This may facilitate use of the lubricant manifold 118 when, for example, the lubricant filter 148 is clogged.

The body 121 also includes an auxiliary outlet channel 158 (e.g., passage, passageway, runner, etc.). The auxiliary outlet channel 158 is integrally formed with the body 121 (e.g., the body 121 and the auxiliary outlet channel 158 are of a one-piece construction, etc.). The auxiliary outlet channel 158 is fluidly coupled to main outlet channel 150 and configured to receive the lubricant from the main outlet channel 150.

The lubricant system 110 also includes a transfer conduit 160 (e.g., oil line, etc.). The auxiliary outlet channel 158 is configured to be fluidly coupled to the transfer conduit 160. For example, the transfer conduit 160 may be coupled to the body 121 via a hose clamp such that the transfer conduit 160 is fluidly coupled to the auxiliary outlet channel 158. The auxiliary outlet channel 158 is configured to provide the lubricant to the transfer conduit 160 when the auxiliary outlet channel 158 is fluidly coupled to the transfer conduit 160.

The internal combustion engine system 100 also includes a turbocharger 162. The turbocharger 162 is fluidly coupled to the transfer conduit 160 and is configured to receive the lubricant from the transfer conduit 160 and to provide the lubricant to the transfer conduit 160. The lubricant may be utilized by the turbocharger 162 to lubricate internal components (e.g., bearings, spindles, etc.). In this way, the lubricant manifold 118 can be utilized to cool the lubricant that is provided to both the engine head-block assembly 102 and the turbocharger 162.

The lubricant system 110 also includes an outlet conduit 164 (e.g., oil line, etc.). The outlet conduit 164 is fluidly coupled to the lubricant passages 112 and the transfer conduit 160. The outlet conduit 164 receives the lubricant from both the engine head-block assembly 102 (e.g., via the lubricant passages 112) and the turbocharger 162 (e.g., via the transfer conduit 160). The outlet conduit 164 is also fluidly coupled to the lubricant pump 114 and is configured to provide the lubricant to the lubricant pump 114.

Figure 6:
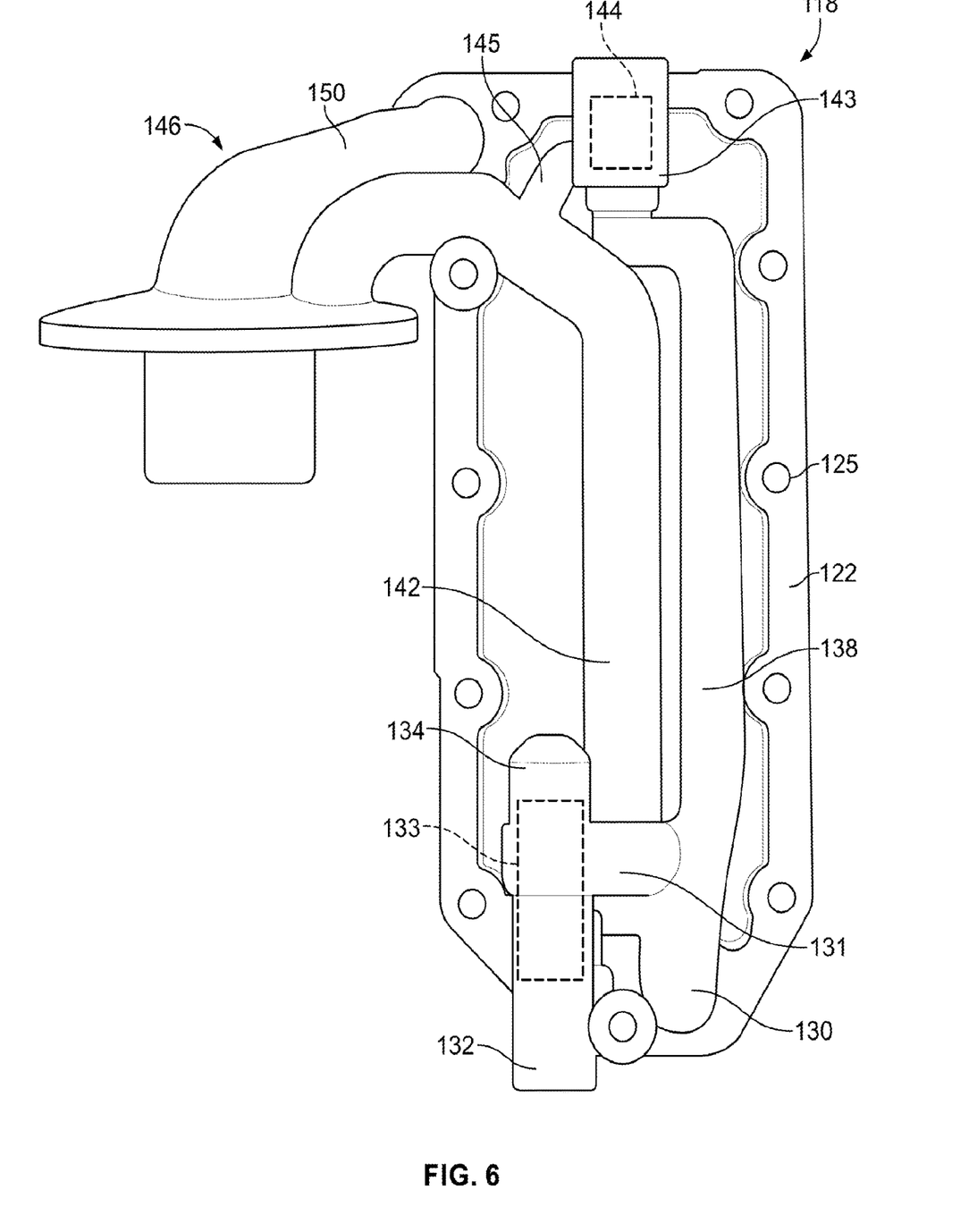
FIG. 6 is a perspective view of another lubricant manifold for an internal combustion engine system.

FIG. 6 illustrates the lubricant manifold 118 according to various embodiments. In these embodiments, the filter bypass channel 154 and the bypass valve 156 are internally formed within the body 121. In some embodiments, the bypass valve port 155 is omitted. In some embodiments, the auxiliary outlet channel 158 is omitted (e.g., depending on requirements for the lubricant system 110, etc.).

III. Manufacturing of the Body of the Lubricant Manifold

The body 121 is assembled via additive manufacturing. For example, the body 121 may be assembled using three-dimensional (3D) printing, selective laser sintering, or other similar processes. As outlined above, the body 121 is configured such that all components of the body 121 are integrally formed. As explained above, the components of the body 121 are "integrally formed" when the components of the body 121 are formed and joined together as part of a single manufacturing step to a create a single-piece or unitary construction, the body 121, that cannot be disassembled without an at least partial destruction of the body 121. For example, the components of the body 121 are: (i) not separable from each other (e.g., one component of the body 121 cannot be separated from the body 121 without destroying the body 121, etc.); (ii) not formed separately from each other (e.g., the components of the body 121 are formed simultaneously, the components of the body 121 are formed as a single component in a single process, etc.); and (iii) there are no gaps or joints along borders between contiguous components of the body 121 (e.g., components that share a border, etc.). In some embodiments, the body 121 is constructed entirely of stainless steel (e.g., stainless steel 316, etc.). In other embodiments, the body 121 is constructed entirely of aluminum or steel.

In contrast to various conventional systems, the body 121 does not contain any copper because the body 121 is assembled via additive manufacturing. Specifically, copper brazing materials utilized in other systems are not incorporated in the body 121 because the body 121 is assembled via additive manufacturing, and all of the components of the body 121 are integrally formed. In other words, brazing materials are not needed to construct the body 121 because the components of the body 121 are not joined together via brazing. Therefore, brazing materials are not included in the body 121. As a result, copper, as well as other brazing materials, cannot leach from the body 121 into the lubricant because copper is not included in the body 121. By protecting the lubricant from copper, the body 121 facilitates prolonged desirable operation of the internal combustion engine system 100.

Additionally, the body 121 does not have any internal joints (e g, between components of the body 121, etc.) that create leakage paths for the lubricant. For example, there are no internal joints between the lubricant filter head 146 and the lubricant cooler 140, for example. As a result, lubricant cannot leak from the body 121. This may decrease warranty costs associated with the internal combustion engine system 100 compared to other systems which have a plurality of internal joints that create leakage paths. These leakage paths can cause leakage of oil over time, thereby making these other systems undesirable.

Furthermore, the part-count (e.g., number of items in a bill of materials, number of stocked items, etc.) for the internal combustion engine system 100 is lower than for other conventional systems because the body 121 is configured such that all components of the body 121 are integrally formed. In other words, rather than having a separate lubricant cooler and filter head, which would constitute two components that have to be separately stocked and subsequently assembled, the body 121 is a single component that includes both the lubricant filter head 146 and the lubricant cooler 140.

The lubricant passages 141 can be configured to each have a target geometry because the body 121 is assembled via additive manufacturing. For example, one lubricant passage 141 may have a first cross-sectional shape (e.g., air foil, teardrop, etc.) and another lubricant passage 141 may have a second cross-sectional shape (e.g., square, triangular, circular, elliptical, etc.) that is different from the first cross-sectional shape. By selecting appropriate cross-sectional shapes for each lubricant passage 141 in accordance with predetermined design and/or performance parameters, a target heat transfer profile for the lubricant cooler 140 may be attained. Additionally, selecting appropriate cross-sectional shapes for each lubricant passage 141 in accordance with predetermined design and/or performance parameters can provide for a target flow rate through the lubricant cooler 140. Still further, a mass of the lubricant manifold 118 may be significantly less than a sum of a mass of a lubricant cooler of another system and a mass of a filter head of another system. This reduction in mass is achieved because the body 121 is configured such that all components of the body 121 are integrally formed and because the body 121 is assembled via additive manufacturing. Specifically, because the body 121 is configured such that all components of the body 121 are integrally formed, masses of bolts that attach the various components used in other systems are not included in the lubricant manifold 118. Additionally, because the body 121 is assembled via additive manufacturing, a wall thickness of the body 121 may be less than wall thicknesses of lubricant coolers and/or filter heads in other systems. Specifically, by using the additive manufacturing process described herein, structural characteristics of the body 121 may be attained that are not otherwise possible in components that are joined together. For example, components that are separately manufactured and then joined together may need to be thicker than an additive manufactured component such as the body 121 because the components that are joined together are subjected to stresses due to fasteners, adhesive, and/or welds along joints between the components that are joined together. By eliminating these joints, additive manufactured components such as the body 121 do not need to be as thick in analogous areas.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as lubricant, liquid lubricant, gaseous lubricant, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary, Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. A lubricant manifold comprising:
 a lubricant filter head configured to be coupled to a lubricant filter;
 a pump inlet channel fluidly coupled to the lubricant filter head and integrally formed with the lubricant filter head, the pump inlet channel configured to receive a lubricant and provide the lubricant to the lubricant filter head;
 an inlet transfer channel fluidly coupled to the lubricant filter head and integrally formed with the lubricant filter head and the pump inlet channel, the inlet transfer channel configured to receive the lubricant from the pump inlet channel; and
 a lubricant cooler fluidly coupled to the inlet transfer channel and integrally formed with the lubricant filter head, the pump inlet channel, and the inlet transfer channel, the lubricant cooler configured to receive the lubricant from the inlet transfer channel.

2. The lubricant manifold of claim 1, wherein the lubricant filter head, the pump inlet channel, the inlet transfer channel, and the lubricant cooler are produced as a single component in a single additive manufacturing process.

3. The lubricant manifold of claim 1, further comprising an outlet transfer channel fluidly coupled to the lubricant cooler and integrally formed with the lubricant filter head, the pump inlet channel, the inlet transfer channel, and the lubricant cooler, the outlet transfer channel configured to receive the lubricant from the lubricant cooler and to provide the lubricant to the lubricant filter head.

4. The lubricant manifold of claim 3, further comprising a main outlet channel fluidly coupled to the outlet transfer channel and integrally formed with the lubricant filter head, the pump inlet channel, the inlet transfer channel, the lubricant cooler, and the outlet transfer channel, the main outlet channel configured to receive the lubricant from the lubricant filter head and to provide the lubricant from the lubricant manifold.

5. The lubricant manifold of claim 3, further comprising a thermostat channel fluidly coupled to the inlet transfer channel and the outlet transfer channel, the thermostat channel integrally formed with the lubricant filter head, the pump inlet channel, the inlet transfer channel, the lubricant cooler, and the outlet transfer channel, the thermostat channel configured to receive the lubricant from the inlet transfer channel and to provide the lubricant to the outlet transfer channel.

6. The lubricant manifold of claim 3, further comprising:
 a filter bypass channel fluidly coupled to the lubricant filter head and integrally formed with the lubricant filter head, the pump inlet channel, the inlet transfer channel, the lubricant cooler, and the outlet transfer channel, the filter bypass channel configured to receive the lubricant from the lubricant filter head;
 a bypass valve port fluidly coupled to the outlet transfer channel and integrally formed with the lubricant filter head, the pump inlet channel, the inlet transfer channel, the lubricant cooler, the outlet transfer channel, and the filter bypass channel, the bypass valve port configured to selectively receive the lubricant from the filter bypass channel; and
 a bypass valve disposed within the bypass valve port, the bypass valve configured to receive the lubricant from the filter bypass channel and selectively provide the lubricant to the bypass valve port.

7. The lubricant manifold of claim 1, further comprising:
 a high pressure release valve port fluidly coupled to the pump inlet channel and integrally formed with the lubricant filter head, the pump inlet channel, the inlet transfer channel, and the lubricant cooler, the high pressure release valve port configured to receive the lubricant from the pump inlet channel; and
 a high pressure release valve disposed within the high pressure release valve port, the high pressure release valve configured to receive the lubricant from the pump inlet channel and selectively provide the lubricant from the lubricant manifold.

8. The lubricant manifold of claim 1, wherein the lubricant cooler comprises:
 a first lubricant passage having a first cross-sectional shape; and
 a second lubricant passage having a second cross-sectional shape different from the first cross-sectional shape.

9. The lubricant manifold of claim 8, wherein the first cross-sectional shape is an air foil.

10. An internal combustion engine system comprising:
 an engine head-block assembly comprising:
  a lubricant manifold recess; and
  a mounting face extending around the lubricant manifold recess; and
 a lubricant manifold comprising a body at least partially received within the lubricant manifold recess, the body comprising:
  a lubricant filter head configured to be coupled to a lubricant filter;
  a lubricant cooler fluidly coupled to the lubricant filter head and integrally formed with the lubricant filter head, the lubricant cooler providing a lubricant to the lubricant filter head; and
  a flange integrally formed with the lubricant filter head and the lubricant cooler, the flange coupled to the mounting face such that the lubricant cooler is at least partially received within the lubricant manifold recess,
wherein the lubricant filter head, the lubricant cooler, and the flange are of a one-piece construction.

11. The internal combustion engine system of claim 10, wherein:
the lubricant filter head is not formed separately from the lubricant cooler or the flange;
the lubricant cooler is not formed separately from the lubricant filter head or the flange; and
the flange is not formed separately from the lubricant filter head or the lubricant cooler.

12. The internal combustion engine system of claim 10, wherein:
the lubricant cooler is contiguous with the flange along a border; and
the lubricant cooler is not separated from the flange along the border.

13. The internal combustion engine system of claim 10, wherein:
the engine head-block assembly further comprises a lubricant inlet channel;
the body further comprises a pump inlet channel fluidly coupled to the lubricant filter head and the lubricant inlet channel, the pump inlet channel integrally formed with the lubricant filter head, the lubricant cooler, and the flange, the pump inlet channel receiving the lubricant from the lubricant inlet channel and providing the lubricant to the lubricant filter head.

14. The internal combustion engine system of claim 10, wherein:
the engine head-block assembly further comprises an engine inlet aperture; and
the body further comprises a main outlet channel fluidly coupled to the engine inlet aperture and integrally formed with the lubricant filter head, the lubricant cooler, and the flange, the main outlet channel receiving the lubricant from the lubricant filter head and providing the lubricant to the engine inlet aperture.

15. A lubricant manifold comprising:
a lubricant cooler configured to receive a lubricant;
an outlet transfer channel fluidly coupled to the lubricant cooler and integrally formed with the lubricant cooler, the outlet transfer channel configured to receive the lubricant from the lubricant cooler; and
a lubricant filter head configured to be coupled to a lubricant filter, the lubricant filter head fluidly coupled to the outlet transfer channel and integrally formed with the lubricant cooler and the outlet transfer channel, the lubricant filter head configured to receive the lubricant from the lubricant cooler.

16. The lubricant manifold of claim 15, wherein the lubricant cooler, the outlet transfer channel, and the lubricant filter head are produced as a single component in a single additive manufacturing process.

17. The lubricant manifold of claim 16, further comprising a main outlet channel fluidly coupled to the outlet transfer channel and integrally formed with the lubricant cooler, the outlet transfer channel, and the lubricant filter head, the main outlet channel configured to receive the lubricant from the lubricant filter head and to provide the lubricant from the lubricant manifold.

18. The lubricant manifold of claim 16, further comprising a thermostat channel fluidly coupled to the outlet transfer channel, the thermostat channel integrally formed with the lubricant cooler, the outlet transfer channel, and the lubricant filter head, the thermostat channel configured to provide the lubricant to the outlet transfer channel.

19. The lubricant manifold of claim 15, further comprising:
a high pressure release valve port integrally formed with the lubricant cooler, the outlet transfer channel, and the lubricant filter head; and
a high pressure release valve disposed within the high pressure release valve port, the high pressure release valve configured to selectively provide the lubricant from the lubricant manifold.

20. The lubricant manifold of claim 15, wherein the lubricant cooler comprises:
a first lubricant passage having a first cross-sectional shape; and
a second lubricant passage having a second cross-sectional shape different from the first cross-sectional shape.

* * * * *